UNITED STATES PATENT OFFICE.

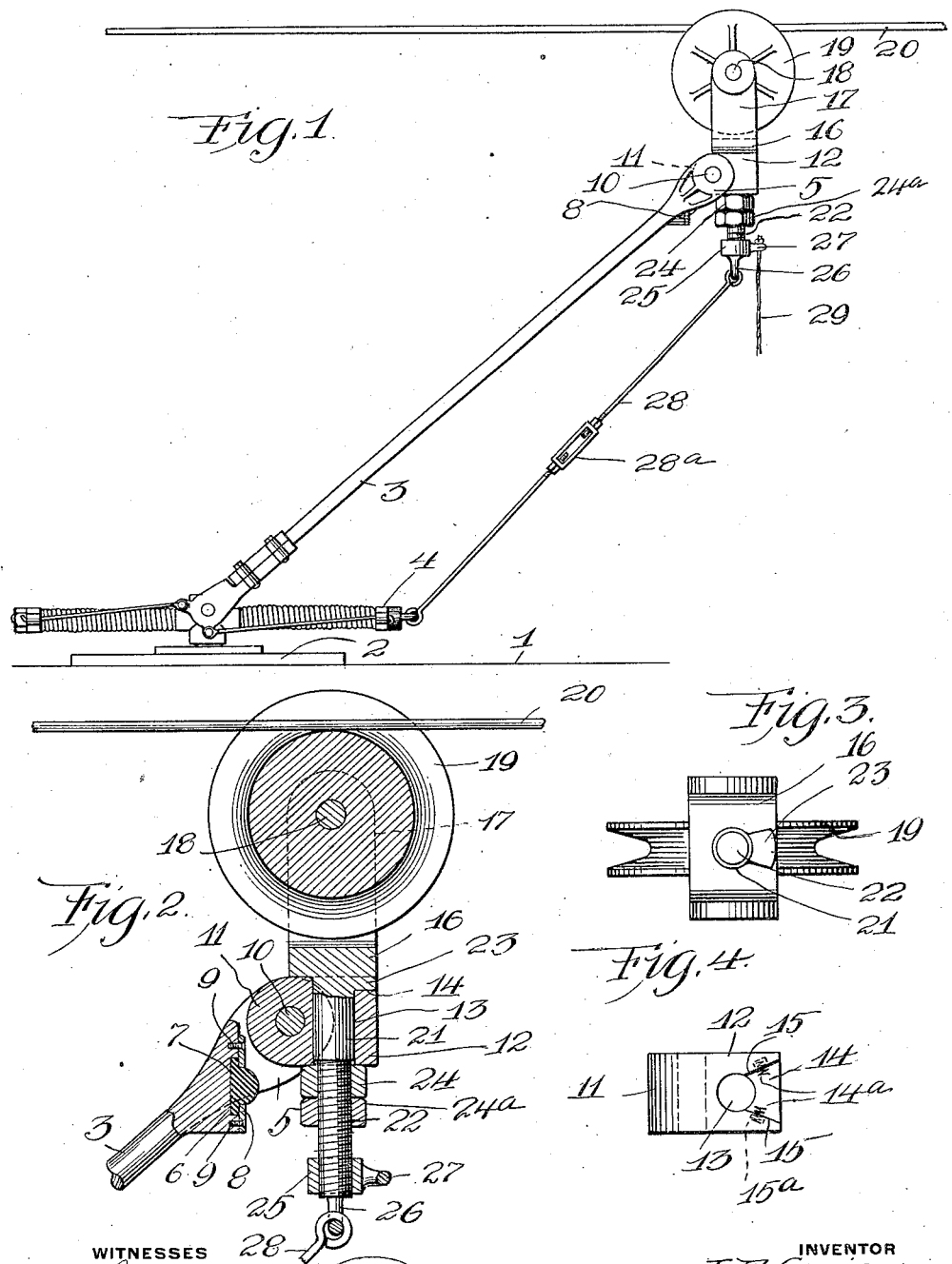

JOSEPH E. GEIGER, OF KITTANNING, PENNSYLVANIA.

TROLLEY.

1,088,337.   Specification of Letters Patent.   Patented Feb. 24, 1914.

Application filed August 17, 1910. Serial No. 577,567.

*To all whom it may concern:*

Be it known that I, JOSEPH E. GEIGER, a citizen of the United States of America, residing at Kittanning, in the county of Armstrong and State of Pennsylvania, have invented certain new and useful Improvements in Trolleys, of which the following is a specification, reference being had therein to the accompanying drawing.

This invention relates to trolleys and the primary object of the invention is to furnish the harp of a trolley pole with a swivel that will allow the harp to partially rotate and retain the revoluble wheel thereof upon a wire when a car or vehicle equipped with the trolley pole is rapidly passing around a curve or over an irregular section of a road.

Another object of this invention is to provide a trolley pole with a pivoted harp that can easily adjust itself to any irregularity in a trolley wire and compensate for any inequality in the distance between the car or vehicle and the trolley wire.

With these and such other objects in view as may hereinafter appear, the invention consists of the novel construction, combination, and arrangement of parts to be hereinafter specifically described and then claimed.

Reference will now be had to the drawing forming a part of this specification, wherein there is illustrated a preferred embodiment of the invention, but it is to be understood that the structural elements thereof are susceptible to such changes as fall within the scope of the appended claim.

In the drawing Figure 1 is a side elevation of the trolley. Fig. 2 is a vertical sectional view of the trolley head. Fig. 3 is a bottom plan of the trolley harp, and Fig. 4 is a plan of a detached harp member.

The reference numeral 1 denotes the top of a car or vehicle having a trolley base 2 and a pivoted spring-held trolley pole 3, the pole being normally held at an inclination through the medium of a tension device 4. The upper end of the pole 3 is bifurcated to provide oppositely disposed apertured arms 5 and the upper end of the pole between said arms is provided with a socket 6 for a buffer 7, preferably made of rubber. The buffer 7 is retained within the socket 6 by an apertured plate 8 secured to the pole by screws or other fastening means 9. The object of this buffer will presently appear.

Pivotally mounted between the arms 5 by a transverse pin 10 is the rear rounded end 11 of a harp member 12, said member having the forward end thereof provided with a vertical opening 13 and the top thereof with a V-shaped recess 14 between the upper end of the opening 13 and the forward edge of the member, the walls 15 of the recess serving functionally as stops. The walls 15 have sockets 15$^a$ for coiled springs 14$^a$.

Movably mounted upon the harp member 12 is a harp 16 and revolubly mounted between the arms 17 of the harp by a transverse pin 18 is a trolley wheel 19 adapted to travel upon a trolley wire 20. The trolley harp 16 is provided with a depending shank 21 terminating in a threaded stem 22, said shank extending through the vertical opening 13 of the harp member 12. The under forward edge of the harp 16 is provided with a depending lug 23 adapted to extend into the recess 14 and engage the springs 14$^a$, which limit the swivel movement of the harp upon the harp member. To retain the shank 21 in the opening 13 nuts 24 and 24$^a$ are screwed upon the stem 22, and screwed upon the lower end of the stem is a cap 25 having a depending eyelet 26 and a rearwardly extending eyelet 27. The former is loosely connected by a rod 28 to the rear end of the tension device 4, and the latter is provided with the ordinary rope or cable 29, whereby the trolley can be easily removed from the wire 20 or placed in engagement therewith. The rod 28 has a turnbuckle 28$^a$ whereby the trolley can be easily adjusted.

The rod 28 normally retains a trolley harp in a vertical position with respect to the upper end of a pole 3. As the rod 28 retains the harp in a vertical position it allows that the trolley be easily placed in engagement with the trolley wire 20. There is sufficient play between the eyelets 26 and 28 so that the shifting of the shank 21 in the opening 33 of the harp member 12 will not be retarded when the trolley wheel adjusts itself to the curvature of the trolley wire 20. The connection between the eyelets 26 and 28 being a loose one as clearly shown in Fig. 2.

The buffer 7 is adapted to prevent the trolley harp member 12 or the nut 24 from being injured should the trolley wheel encounter an obstruction that would throw the member 12 against the upper end of the pole. While it is not essential to use the buffer, it is preferable to insure a safe operation of the trolley.

What I claim, is:

In a trolley, a trolley pole, a support therefor, a harp member extending into the upper end of the pole, a horizontally disposed pivot between said member and the upper end of the pole, a buffing means carried by the upper end of the pole for said harp member, a harp provided with a vertically disposed shank pivotally mounted in said member, said shank projecting below said member, said harp member having its upper face provided with a V-shaped seat, oppositely disposed springs carried by said member above said seat and capable of being engaged by the harp when the latter is pivoting, means carried by the projecting end of said shank for maintaining the harp in position, a trolley wheel mounted in the harp, and an adjustable link member loosely connected to the projecting end of the shank and further connected to said support.

In testimony whereof I affix my signature in the presence of two witnesses.

JOSEPH E. GEIGER.

Witnesses:
 AUSTIN CLARK,
 E. R. LEE.

Copies of this patent may be obtained for five cents each, by addressing the "Commissioner of Patents, Washington, D. C."